H. A. MYERS.
BRAKE MECHANISM.
APPLICATION FILED DEC. 27, 1915.
1,197,845.
Patented Sept. 12, 1916.
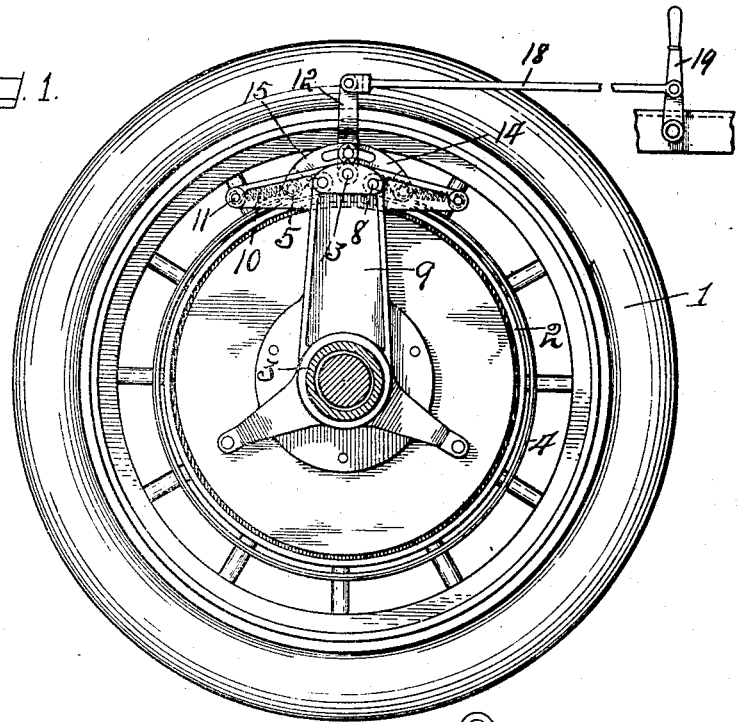
Fig. 1.
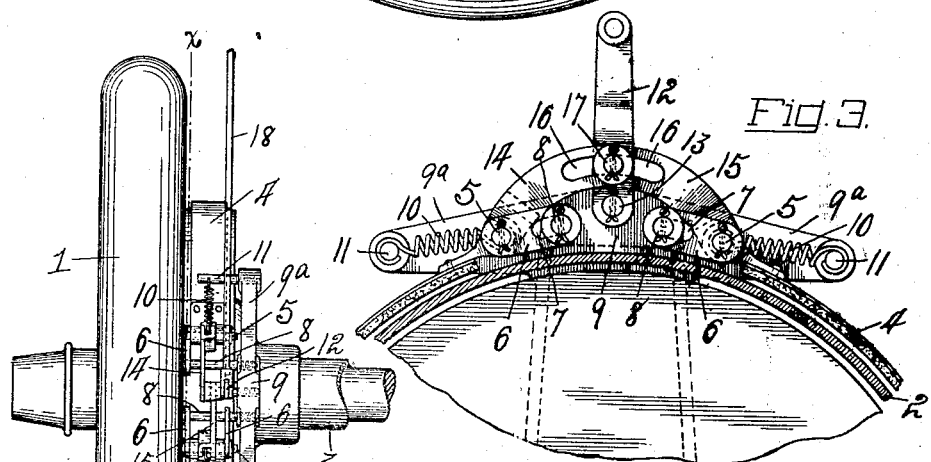
Fig. 2.
Fig. 3.
INVENTOR
Hubert A. Myers,
By Owen, Owen & Crampton,
His attys.

UNITED STATES PATENT OFFICE.

HUBERT A. MYERS, OF TOLEDO, OHIO, ASSIGNOR OF ONE-HALF TO ARTHUR S. HICKOK, OF TOLEDO, OHIO.

BRAKE MECHANISM.

1,197,845.  Specification of Letters Patent.  Patented Sept. 12, 1916.

Application filed December 27, 1915. Serial No. 68,852.

*To all whom it may concern:*

Be it known that I, HUBERT A. MYERS, a citizen of the United States, and a resident of Toledo, in the county of Lucas and State of Ohio, have invented a certain new and useful Brake Mechanism; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for imparting a braking action to rotating elements, and particularly to a divisional feature of my application for United States Letters Patent filed December 8, 1914, Serial Number 876,033, which has matured in Patent No. 1,182,402.

The object of my invention is the provision of simple and efficient means which is easily operable by a very slight pressure on a control part to apply a powerful braking action to a rotating part in either direction of rotation thereof.

The invention is fully described in the following specification, and while, in its broader aspect, it is capable of embodiment in numerous forms, a preferred embodiment thereof is illustrated in the accompanying drawings, in which—

Figure 1 is an inner side elevation of an automobile wheel having a brake drum thereon and equipped with my invention. Fig. 2 is a top plan view thereof, and Fig. 3 is an enlarged fragmentary section on the line *x, x* in Fig. 2.

Referring to the drawings, 1 designates a rotatable element which, in the present instance, is represented as an automobile wheel and has the customary brake drum 2 secured to one side thereof, and 3 is the axle housing.

A brake band 4 is mounted on the brake drum 2 and has its ends terminating in spaced relation and each provided, in the present instance, with a transversely extending pivot stud 5, from the opposite ends of which links 6 pivotally project, as best shown in Figs. 2 and 3. The links are provided in their outer end portions with longitudinally extending slots 7 for receiving respective anchoring pins or studs 8 that project from a stationary bracket member 9 transversely of the drum, one of said studs being provided for the links at each end of the band 4. The bracket 9 is fixedly attached, in the present instance, to the housing 3.

The brake band 4 is normally held in released relation to the brake drum 2 by the contractile springs 10, which are attached at their inner ends to the respective studs 5, and project outward therefrom, and are anchored at their outer ends to stationary studs 11, which fixedly project from the outer ends of the respective oppositely projecting arms 9ª of the bracket 9. The springs 10 exert an outward pull on each set of anchoring links 6 of the band, the extent of outward movement of the band being limited by the outer ends of the link slots 7 coacting with the respective anchoring studs 8.

12 designates a lever member, which is fulcrumed at its inner end to a stud 13 at the outer end portion of the bracket 9 and is disposed in substantial radial relation to the brake drum. Projecting toward each other from the opposite ends of the brake band 4, to which they are respectively pivoted, are two draft links 14 and 15, each of which is provided at its outer or free end, with relation to the band, with a longitudinally extending slot 16, into which the respective end of a pin 17, that is carried by the lever 12, without its fulcrumed end, projects. In the present instance, the draft links 14 and 15 are connected to the pivot pins 5 at the respective ends of the band 4. When the brake band 4 is in its normal or released position with respect to the brake drum, the pin 17 stands at the outer end of each slot 16 of the draft members. It is thus evident that an oscillatory movement of the lever 12 to the right in Fig. 3 will impart movement alone to the link 14, and that an oscillatory movement of the lever 12 in the opposite direction will impart movement alone to the draft link 15. It is also evident that when a movement of the lever 12 causes a pulling stress to be applied to either draft member 14, 15 and the respective end of the brake band, the other end of the brake band will be anchored against movement in the direction of pull by the respective stud 8. The rocking movements of the lever 12 may be controlled in any suitable or convenient manner, and for this purpose I have illustrated, in the present instance, a link or rod 18 extending transversely from the outer end of the lever 12 to a hand control lever 19.

It is apparent that it is only necessary to exert a very light rocking pressure on the outer end of the lever 12 to exert a contracting pull on one end or the other of the brake band, and that the contracting pull on the brake band should be exerted in the direction of rotation of the brake drum, so that when the brake band has been drawn into braking contact with the drum, the friction between the drum and band, due to the turning of the former, will assist the operator in tightening the brake band on the drum. The application of a braking stress on the band 4 in the direction of turning of the brake drum renders the braking action much more effectual than would otherwise be the case, as the turning of the drum assists in effecting a tightening of the band thereon when in braking or frictional contact therewith. It is thus evident that it is only necessary to apply a force on the lever 12 which is a little more than sufficient to overcome the outward pulling tension of the spring 10, and to thereby effect an inward drawing of the brake band into contact with the brake drum.

It will be understood that on whichever end of the brake band the pulling stress is applied through the medium of the lever 12 and connecting draft link, the other end of the band will be anchored against movement by the stud 18, to which it is attached.

I wish it understood that my invention is not limited to any specific construction, arrangement of form of the parts, as it is capable of numerous modifications without departing from the spirit of the invention, as defined in the claims.

Having thus described my invention, what I claim as new, and desire to secure by Letters Patent, is—

1. The combination with a rotatable member and a stationary part, of a brake band for engaging a portion of said member and having its ends connected to said part for limited to and fro movements relative thereto, and means operable to apply a contracting stress to either end of the brake band to tighten it with respect to the rotatable member and without disturbing the position of the other end of the band or applying a contracting stress thereto.

2. In combination, a rotatable member, a brake band encircling a part thereof, means having spaced connection with both ends of said band and operable to apply a tightening stress on only one end of the band at a time, and means having connection with both ends of said band and serving as an anchoring means for either end when the other end of the band is drawn inward to apply a braking action to the band.

3. In combination, a rotatable member, a brake band encircling a part of said member, a lever member, separate connections between said lever member and the respective ends of said band and independently operable in conjunction with said lever to impart predetermined movements to either end of the band, depending on the direction of movement of the lever, and means forming an anchor for each end of the lever for anchoring each end against movement in the direction of applied stress on the other end of the band.

4. In combination, a rotatable member, a brake band, a stationary part to which the ends of the brake band are anchored, each for movement relative thereto, means normally retaining the ends of the brake band at the limit of their respective outward movements relative to said anchoring means, and means for applying a band contracting stress alone to either end of the band to cause it to frictionally engage said rotatable member.

5. In combination, a rotatable member, a brake band encircling part of said member, a stationary part to which the ends of said member are anchored for respective movements to permit limited contracting and expanding movements of the band, means normally retaining the band in expanded relation to said member, a lever, and separate connections between said lever and the band ends operable by predetermined movements of the lever to apply a contracting stress to either end of the band without disturbing the position of the other end thereof or applying a contracting stress thereto.

6. In combination, a rotatable member, a stationary part, a friction band for engaging said member and having its ends each anchored to said part for yielding inward or contracting movements, a lever having its fulcrum fixed with respect to said stationary part, a pair of draft links projecting in opposite directions from said lever and each in connection at its outer end with the respective band end, said links having movable connection with said lever and said lever when rocked in one direction applying a contracting stress through one link to one end of said band, and vice versa, and means normally retaining said band in released relation to said member.

7. In combination, a rotatable member, a stationary part, a brake band for frictional engagement with said member and having each end in longitudinally movable pin-and-slot connection with said part, and means having connection with each end of the brake band and operable to apply a band contracting stress alone to either end thereof.

8. In combination, a member rotatable in either direction, a stationary part, a friction band for engaging a part of said member and having its ends each anchored to said part for limited to and fro movements in substantial tangential relation to a circle concentric to the member axis, and means operable to apply a band contracting stress alone to either end of the band to place the band in frictional engagement with said member and without disturbing the position of the other end of the band, the contracting stress on the band being in the direction of rotation of the member whereby a rotating of the member in engagement with the band will serve to increase the contracting or braking action of the band on the member.

9. In combination, a member rotatable in either direction, a stationary part, a friction band for engaging a part of said member and having its ends each anchored to said stationary part for limited to and fro movements, means exerting a yielding outward pull on the friction band ends to normally retain them at the limit of their outward movements, a movable operating member and separate connection between each operating member and each end of said band, and operable by predetermined movements of said operating member to apply a contracting stress alone on either end of the band, the end of the band on which the stress is applied depending on the direction of rotation of the rotatable member.

10. In combination, a rotatable member, a stationary part, a friction band for engaging said member and having its ends each anchored to said part for yielding inward or contracting movements, a lever fulcrumed adjacent to the ends of said band, a draft link projecting from each end of the band and having pin-and-slot connection with said lever whereby a movement of the lever in one direction applies a band contracting stress to one link and a movement of the lever in the other direction applies a band contracting stress to the other link, a control member at a distance from said lever, and connection between said control member and lever for communicating predetermined movements from one to the other thereof.

In testimony whereof, I have hereunto signed my name to this specification.

HUBERT A. MYERS.

Copies of this patent may be obtained for five cents each, by addressing the "Commissioner of Patents, Washington, D. C."